Feb. 18, 1958  C. W. BELDEN ET AL  2,823,527
GEAR TYPE COUPLINGS
Filed May 16, 1955  2 Sheets-Sheet 1

INVENTOR.
Charles W. Belden
BY Harley E. Northrop
Harry P. Canfield

Feb. 18, 1958  C. W. BELDEN ET AL  2,823,527
GEAR TYPE COUPLINGS
Filed May 16, 1955  2 Sheets-Sheet 2
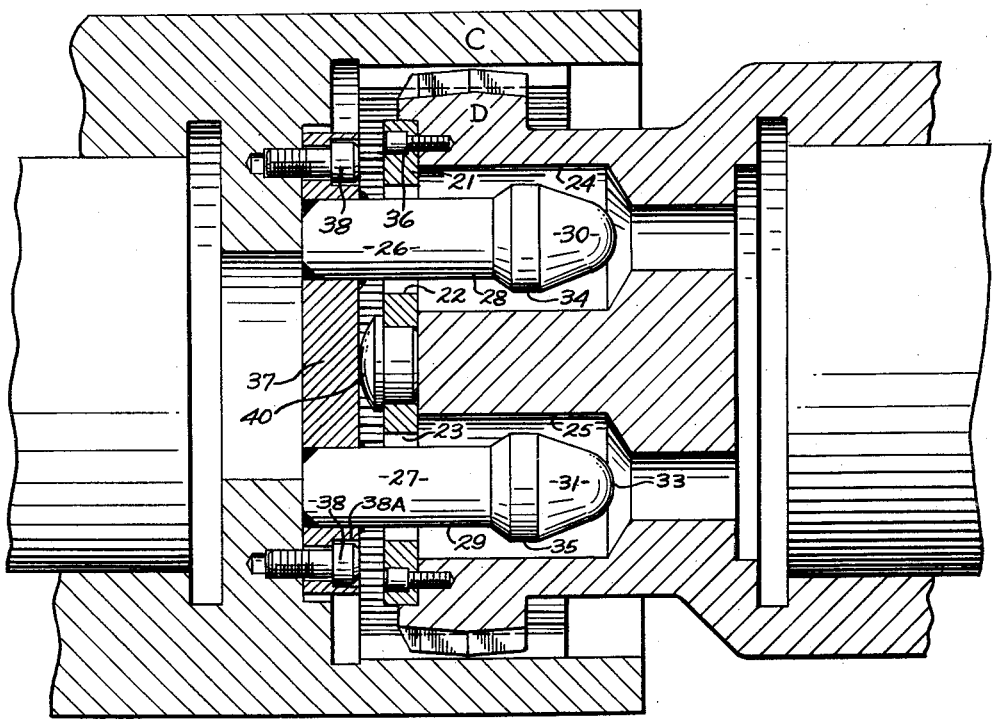
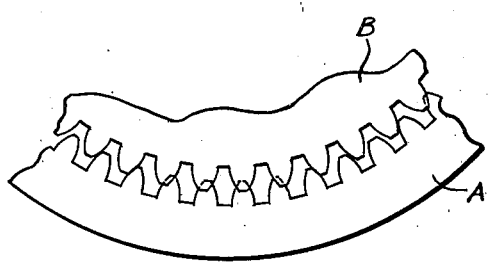
INVENTOR.
Charles W. Belden
BY Harley E. Northrop
Harry P. Canfield

United States Patent Office 2,823,527
Patented Feb. 18, 1958

2,823,527

GEAR TYPE COUPLINGS

Charles W. Belden and Harley C. Northrop, Westfield, N. Y., assignors to Ajax Flexible Coupling Co. Inc., Westfield, N. Y., a corporation of New York Application May 16, 1955, Serial No. 508,559

8 Claims. (Cl. 64—9)

This invention relates to couplings for coupling rotary shafts together and relates particularly to couplings of the so-called gear type, comprising an outer gear with internal teeth connected to one shaft and an inner gear with external teeth connected to the other shaft; the gears being concentric and all of the teeth of the two gears meshed so that rotation of one will drive the other in unison with it.

Illustrative of such couplings is that described in the copending patent application Serial No. 546,744 filed November 14, 1955, which coupling has the property of being able to transmit the rotary movement of one shaft to the other when the shafts are at an angle of misalignment to each other and to do so without either back lash lost motion or binding through a predetermined range of misalignment angles.

The outer and inner gears of such couplings are assembled into coupled relation by moving them together axially, with telescoping movement, the ends of the teeth of one entering and sliding into the tooth spaces of the other.

In one type of convenient structure the gears are provided with hubs and the hubs are secured on the shafts and the shafts, or both the shafts and the apparatus rotatably supporting them, are shifted one relative to the other to telescopically mesh the gear teeth.

This assembling or telescoping together of the two gears of the coupling raises no problem when the parts are small and of small mass and inertia. There are many uses of such couplings in the various arts, and in some of them the gears and the shafts and parts connected to the shafts that must be moved to effect telescoping have great mass and inertia and in such cases a problem must be solved to avoid mutilation of the gear teeth in the assembling operation.

One important example of such cases is in rolling mills where couplings such as described in said application are provided to couple an end of a roll to the drive shaft coming from the pinion stand.

One of the coupling gears is mounted on the end of the roll shaft and the other on the end of the drive shaft. The roll, in a well known manner, is temporarily balanced by a counter weighted beam, and supported horizontally by a crane hoist cable connected to the beam and moved longitudinally into its bearings in the roll stand whereby the coupling gear, on its leading end, approaches the other gear, stationary on the drive shaft, for telescoping them together.

Before telescoping can be effected however, two conditions must obtain: the circular series of teeth on the two gears must be brought into concentricity and, the two gears must be relatively rotated or indexed to align the teeth of each gear with the tooth spaces of the other gear.

In the case of a mill roll, here being considered as an example, the gear on the roll can be manipulated to bring it into close confronting proximity to the gear on the drive shaft, and then a final movement of the roll telescopes the gear together, but unless the gears are at that moment concentric and alignedly indexed as referred to, the teeth will strike with violent impact due to the mass and inertia of the roll and the teeth will be broken, chipped or otherwise mutilated rendering the coupling unfit for use.

To attempt to position the gears for telescoping by manipulating the massive roll, calls for a nicety of adjustment practically impossible to attain.

It is the main object of this invention to provide a coupling of the type referred to having improved structure by which when the two coupling gears are moved toward each other to telescope them they automatically move to mutually concentric positions, and with the teeth indexed into alignment with the tooth spaces, as referred to.

The invention in general comprises pilot elements on the respective gears which mutually engage and steer or pilot the teeth of the gears into mutual concentricity, and which also index them to align the teeth with tooth spaces, prior to actual telescoping, and until meshing or telescoping thereof has begun; and which disengage by the time the telescoping coupling movement has been completed, leaving the gears free and independent of the pilot elements so that they may tip or oscillate on each other when the coupling rotates in use, as they will in such couplings when their respective shafts are at a misalignment angle.

An embodiment of the invention is fully disclosed in the following description taken in connection with the accompanying drawing in which:

Fig. 3 is a view similar to Fig. 2 but illustrating a modification; and,

Fig. 4 is a fragmentary elevational view from the plane 4—4 of Fig. 1.

Figure 1:
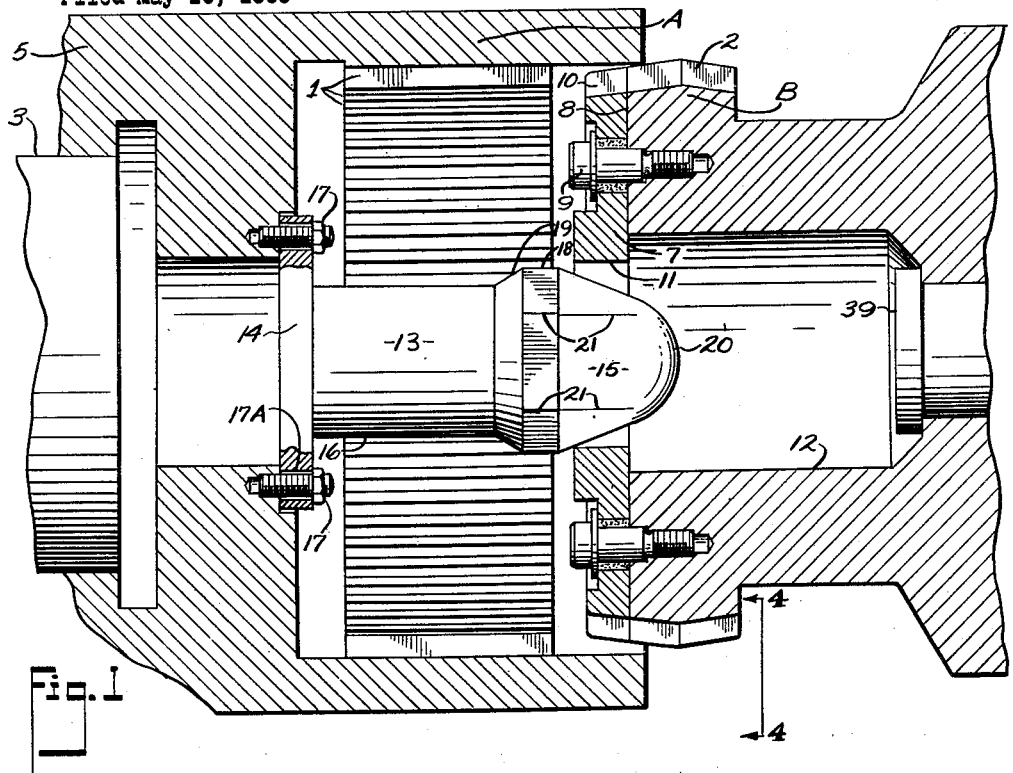
Fig. 1 is a longitudinal sectional view with the aforesaid two gears of a coupling before being moved into meshed coupling relation.

Referring to the drawing there is shown at A an annular gear having a circular series of internal teeth 1—1; and at B a spur gear having a circular series of external teeth 2—2. The full circle of teeth of gears A and B are not shown but are indicated conventionally.

At 3 and 4 are shafts to which the gears A and B are respectively coaxially connected; the exact structure in this respect being not essential and being simplified for illustrative purposes by showing the gears A and B as having hubs 5 and 6 and mounted on the shafts 3 and 4.

Figure 2:
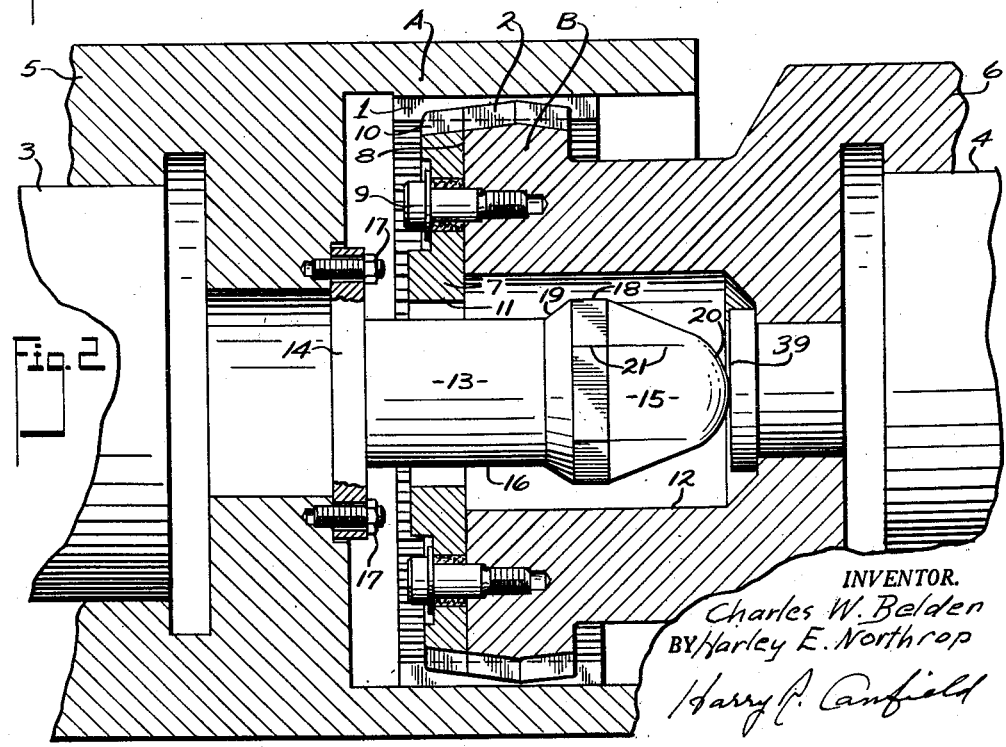
Fig. 2 is a view of the parts of Fig. 1 after coupling has been effected.

When the teeth of the gears A and B are mutually meshed, as in Fig. 2, the gears constitute a coupling for the shafts 3 and 4; and the gear teeth preferably having the form of the teeth of the aforesaid patent application, with the advantages described therein.

The spur gear B has a pilot element 7 thereon in the general form of a plate, mounted on a planar face 8 of the gear by a plurality of bolts 9. The outer periphery of the plate is preferably provided with teeth 10—10 constituting continuations or extensions of the teeth 2—2, but this is not essential; and at its center the pilot element 7 has a pilot aperture 11 therethrough with a polygonal periphery, preferably hexagonal, and coaxial with the teeth of the gear B.

Inwardly of the aperture 11 the gear B has a deep recess 12 of larger diameter than the aperture 11 and of a depth to be referred to.

The gear A has a pilot element thereon in the general form of a headed post 13 having a flange 14 on one end and a head 15 on the other end, and a shank 16 therebetween.

The flange 14 is secured to the hub 5 of the annular gear A by a plurality of bolts 17—17, so that the post 13 projects forwardly within the annular gear A.

As clearly shown, in Fig. 2 the shank 16 is of smaller diameter than the pilot aperture 11.

The post head 15 comprises a polygonal preferably hexagonal band-like surface 18 therearound corresponding to the hexagonal pilot aperture 11, and sized diametrically so as to slidingly fit the aperture 11; and this hexagonal surface 18 if coaxial with the teeth of the gear A. To readily attain this coaxial relation the flange 14 may be made adjustable on the gear A by oversized holes 17A in the flange through which the bolts 17 extend. The hexagonal surface 18 is joined to the shank 16 by an abruptly tapering portion 19. Forwardly of the hexagonal surface 18 the flats of the hexagon surface taper toward the axis and finally merge with a rounded free end 20 of the post.

The operation of the above described structure to facilitate telescopingly meshing the teeth of the two gears, which is the main purpose thereof, will now be described. In Fig. 1 the two gears A and B are shown confronting each other ready to be telescoped as referred to.

The practical application of the invention is predicated on the circumstance that one of the gears, say the gear A, is free to be moved transversely in any direction and also indexed rotatively, as well as being movable toward the gear B, by corresponding movements of the shaft 3, and that the shaft 3 is supported so that it can have such movement; one illustrative instance of such support and movements being a mill roll shaft as hereinbefore referred to.

In Figs. 1 and 4 as an illustrative example the gear A is in a position offset radially with respect to the gear B so that the gear A is not coaxial with the gear B and therefore not able to be telescoped with it and the teeth of the gear A are axially opposite the teeth of the gear B instead of opposite its tooth spaces and for this reason also the gears cannot be telescoped together.

When however the gear A is moved toward the gear B by movement of the shaft 3, the rounded end 20 of the post 13 on the gear A will enter or can be made to enter the pilot aperture 11 of the gear B. Upon continued movement the tapering head 15 of the post will engage and slide on the periphery of the aperture 11 until the hexagon 18 on the post will be coaxial with the aperture 11, and during this movement the convex hexagon corners 21 on the taper of the head 15 will be constrained to slide into or enter the concave hexagon corners of the aperture 11 so that the post will be given a rotary or indexing movement which ultimately brings the two hexagons into coincidence, and on continued movement of the gear A and post 13 the hexagon 18 on the post slidingly enters and fits the hexagonal aperture 11.

The mutual engagement and guiding or piloting action of the aperture 11 and post 13 puts the two gears A and B in such positions that their circular series of teeth are concentric, and also the teeth of the gear A are indexed rotatively until they are aligned with the tooth spaces of the gear B.

The gear A may now be moved toward the gear B to telescope their teeth to complete the coupling assembly.

The parts are proportioned so that when the hexagon 18 of the post 13 is in the hexagon aperture 11, the ends of the teeth of the gear A will be entering the tooth spaces of the gear B. As tooth telescoping movement goes on by further movement of the gear A, the hexagon 18 on the post 13 emerges from the hexagon aperture 11, and by the time the teeth are in fully coupled positions as in Fig. 2 the reduced diameter post shank 16 is in the aperture 11 with large clearance around it, and the post hexagon 18 is in the enlarged diameter recess 12 with large clearance around it.

By this means, the gears when finally coupled are free from and have large clearance with the piloting parts that guided them telescopingly into coupled relation.

This permits the gears to oscillate or nutate freely one on the other as the two gears of gear type couplings are known to do when rotatively coupling shafts whose axes are not in exact alignment.

Further as to the said indexing action, it is presupposed that the aperture hexagon 11 and the post hexagon 18 are properly positioned in relation to the gear teeth. One way to express this relation is, that if a radius through an apex of the aperture hexagon goes through the center of a tooth on the gear B, then a radius through the apex of the post hexagon will go through the center of a tooth space on the gear A.

In Fig. 3 is shown a form of the invention by which the piloting of the two gears into concentricity and indexing them to align their tooth spaces and teeth may be done with circular parts and without polygonal parts which latter may be costly to make with sufficient accuracy, in some cases.

In view of the complete coupling operation described for Figs. 1 and 2 it is believed that it will suffice in this case to show the two gears as already coupled.

The annular gear and spur gear are shown at C and D in Fig. 3.

The gear D is provided with a pilot plate 21 mounted thereon by screws 36 and having two circular apertures 22 and 23, and the gear has enlarged diameter recesses 24 and 25, generally coaxial with the apertures.

The gear C is provided with two posts 26 and 27 having respective shanks 28 and 29 connected to a flange 37 mounted on the gear C by screws 38 in oversize holes 38A in the flange. The shanks 28—29 are smaller in diameter than the apertures 22 and 23 respectively, and have tapering heads 30—31 terminating in free ends 32 and 33, and circular surfaces 34 and 35 between the tapers and the shanks, sized to slidingly fit the apertures 22 and 23 respectively.

The operation is similar to that of the first form. When the two gears C and D are moved toward one another, or one toward the other, the tapering heads 30 and 31 enter the apertures 22 and 23 and by sliding on the peripheries of the apertures bring the circular surfaces 34 and 35 into coincidence with the circular apertures which makes the two gears C and D concentric; and by establishing the proper positional relation between the apertures 22 and 23 and the teeth of the gear D, and between the circular surfaces 34—35 and the teeth of the gear C, the action of the two circular surfaces upon simultaneously entering the two apertures will index the teeth of the two gears so that the teeth of each will be axially opposite the tooth spaces of the other; whereby the two gears can be telescoped together by continued movement of the gear C toward the gear D.

Again as in the first form, by the time the two gears are fully telescoped and the coupling thereof is complete, the circular surfaces 34—35 have emerged from the apertures 22—23, thus freeing the gears from all contact with the guiding or piloting parts which piloted them into telescoping positions.

While this form as appears employs a duplication of apertures and posts as compared with the first form, this is compensated by a much lower degree of required accuracy in the parts and greater ease of obtaining it.

The apertures 22—23 and their mating surfaces 34—35 are circular and easily formed. They do not have to be accurately equidistant from the common gear center, and in fact could be both on the same side of the center. Substantially the only accuracy required is to make the respective apertures 22 and 23 of a size to mate with the circular surfaces 34 and 35 respectively and to position the posts so that the circular surfaces 34—35 thereon and the same distance apart as the apertures 22—23.

To effect the indexing action, by the presence of two apertures and two posts, the relation of the apertures and circular post surfaces to the gear teeth may be expressed as follows. If a line through the centers of both apertures 22 and 23 goes through the center of a tooth on the gear D, then the posts are positioned so that a line through the centers of both circular surfaces 34—35 goes through the center of a tooth space on the gear C. The posts may readily be made to have some adjustment on the gear C for the foregoing purposes, by means of the adjustably movable flange 37.

If desired, the relative axial movement of the two gears when being coupled may be stopped when coupling is complete.

This may be done as illustrated in Figs. 1 and 2, by providing a stop surface 39 on the gear B upon which the end 20 of the head 15 will abut.

Or it may be done as illustrated in Fig. 3 by providing a stop surface 40 on the gear D upon which the flange 37 on the gear C will abut.

The invention has been described as having the apertures on the spur gears and the posts on the annular gears, but this arrangement could be reversed by putting the apertures and posts on the other gears. Telescoping has been described as effected by moving the annular gear toward the spur gear but this could also be reversed as will be understood by those skilled in the art, and illustration and description of such alternatives is believed to be unnecessary.

The invention comprehends all these and other changes and modifications which those skilled in the art may make and which come within the scope of the appended claims.

We claim:

1. In a coupling of the type comprising an outer gear with a circular series of internal teeth and an inner gear with a circular series of external teeth, the teeth of the gears formed to be mutually meshed by axially telescoping them together; means, operated by relative movement of the gears toward each other, to cause said telescoping to occur when the gears are out of coaxial alignment and the teeth and tooth spaces of the respective gears are out of longitudinal alignment, said means comprising guide elements connected to the respective gears disposed to come into mutual engagement upon initiating said movement of the gears, and formed to guide the gears to align them coaxially, and to align the teeth of each gear with the tooth spaces of the other, longitudinally, whereby telescoping will occur upon continuation of said movement; and the guide elements being formed to become mutually disengaged by contination of said movement by the time meshing of the teeth has been completed.

2. In a coupling of the type comprising an outer gear with a circular series of internal teeth and an inner gear with a circular series of external teeth, the teeth of the gears formed to be mutually meshed by axially telescoping the inner and outer gears together; means to facilitate said telescoping movement comprising an aperture in one gear, a pilot element on the other gear having a shank and a tapered free end, and between the free end and the shank having a piloting portion of larger cross section than the shank formed to slidingly fit the aperture; the parts arranged so that upon relative movement of the gears in the telescoping direction the pilot element will enter the aperture and engage its free end with the aperture periphery and guide the piloting portion into the aperture, and upon continued movement will move the piloting portion out of the aperture leaving the shank therein.

3. The construction described in claim 2 and in which the aperture is coaxial with one gear and the piloting portion is coaxial with the other gear.

4. The construction described in claim 2 and in which the aperture periphery and the piloting portion are polygonal in cross section whereby the gears are rotatively indexed to predetermined positions by entrance of the piloting portion into the aperture.

5. The construction described in claim 2 and in which the piloting portion has equally spaced projections therearound, and the aperture periphery has correspondingly spaced recesses formed to guide the projections into the recesses whereby the gears are rotatively indexed to predetermined positions by entrance of the piloting portion into the aperture.

6. In a coupling of the type comprising an outer gear with a circular series of internal teeth and an inner gear with a circular series of external teeth, the teeth of the gears formed to be mutually meshed by axially telescoping the inner and outer gears together; means to facilitate said telescoping movement comprising a pair of apertures in one gear, a pair of male pilot elements on the other gear having respective shanks and tapered free ends and between the free ends and the shanks having respective piloting portions of larger cross section than the shanks, formed to slidingly fit the respective apertures, the parts arranged so that upon relative movement of the gears in the telescoping direction the pilot elements will enter the apertures and engage their free ends with the aperture peripheries and guide both piloting portions into the apertures; and upon continued movement will move the piloting portions out therefrom leaving the shanks therein.

7. In a coupling of the type comprising an outer gear with a circular series of internal teeth and an inner gear with a circular series of external teeth, the teeth of the gears formed to be mutually meshed by axially telescoping the inner and outer gears together; means to facilitate said telescoping movement comprising a pair of apertures in one gear, a pair of male pilot elements on the other gear having respective shanks and tapered free ends and between the free ends and the shanks having respective piloting portions of larger cross section than the shanks, formed to slidingly fit the respective apertures, the parts arranged so that upon relative movement of the gears in the telescoping direction the pilot elements will enter the apertures and engage their free ends with the aperture peripheries and guide both piloting portions into the apertures; and upon continued movement will move the piloting portions out therefrom leaving the shanks therein, the apertures and piloting portions so disposed that entrance of both piloting portions into the apertures moves the gears into mutual concentricity and also rotatively indexes them to predetermined relative positions.

8. In a coupling of the type comprising an outer gear with a circular series of internal teeth and intermediate tooth spaces, and an inner gear with a circular series of external teeth and intermediate tooth spaces, the teeth and tooth spaces of the outer and inner gears formed to become mutually meshed upon movement of the gears relatively axially toward each other, thereby telescoping the teeth of each gear into the tooth spaces of the other gear; means to facilitate said telescoping comprising guiding elements carried by the respective gears, disposed to become engaged with each other by movement of the gears relatively axially toward each other, and formed so that said relative axial movement aligns the gears axially and aligns their respective teeth and tooth spaces, whereby further relative axial movement will telescope the teeth; and the guiding elements formed so that they become disengaged from each other by the relative axial movement of the gears by the time the teeth are completely telescoped.

References Cited in the file of this patent
UNITED STATES PATENTS
2,136,947    Morgan _____ Nov. 15, 1938